April 3, 1962   C. M. CLARK   3,028,039
COOKING DEVICE
Filed Aug. 4, 1960
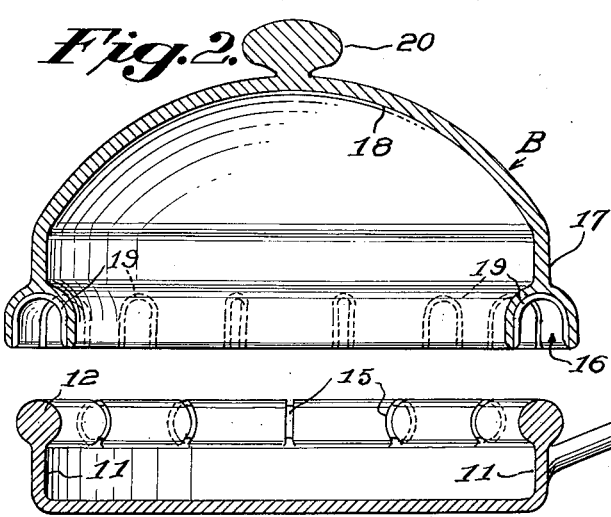
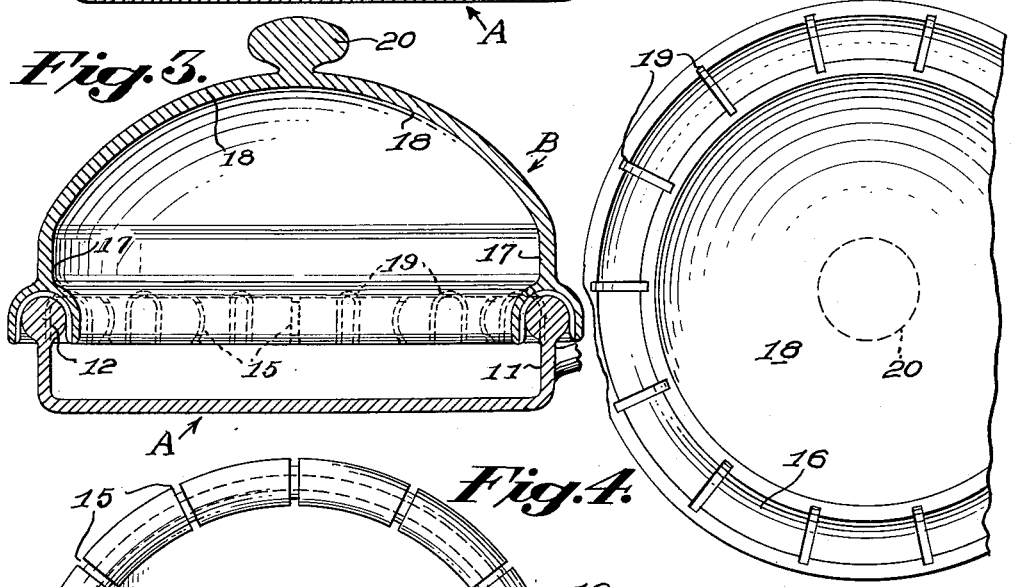
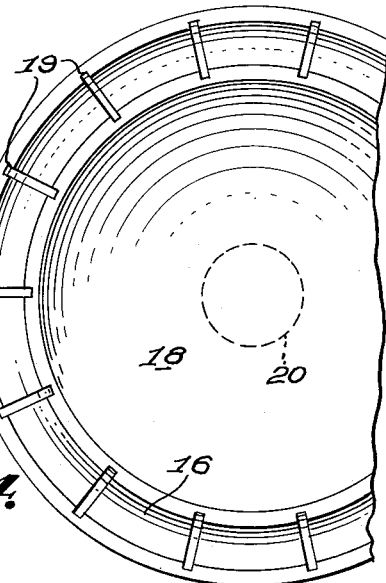
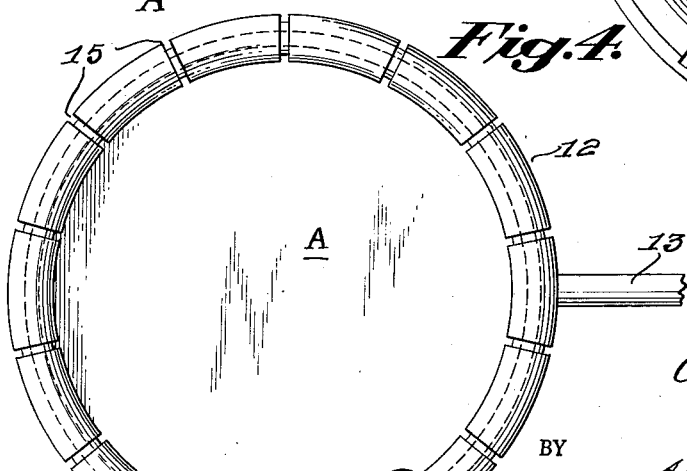
INVENTOR
Charles M. Clark.
BY
Herbert M. Birch
ATTORNEY

United States Patent Office 3,028,039
Patented Apr. 3, 1962

3,028,039
COOKING DEVICE
Charles M. Clark, 1150 NE. Cleveland St.,
P.O. Box 1025, Clearwater, Fla.
Filed Aug. 4, 1960, Ser. No. 46,606
4 Claims. (Cl. 220—44)

The present invention relates to a cooking device and more particularly to a flat pan with a cover therefor.

An object of this invention is to provide a novel cooker, whereby the gaseous vapors developed during cooking are used to efficiently extract grease and nitrogenous waste from meat and the like during cooking by mingling the same with the molten grease and subsequently venting the gaseous vapors as the cooking thereof progresses.

Another object is to provide, in combination, a pan with relatively low thin side walls having an enlarged bead around the upper peripheral edge or pan rim at the top of the thin side walls, said bead being formed with spaced vent means, and a dome-shaped cover having a lower inverted U-shaped cover formed with spaced vent means adapted to embrace the said bead and rest thereon with its vent means alternately spaced with respect to said vent means of the bead rim, whereby the gases developed during cooking escape through said respective vent means.

Still another object is to provide a novel method of cooking meats, such as cutlets, hamburgers and the like.

Yet another object is to provide a simple and economical cooking assembly adapted to be manufactured in mass production by a simple molding process to obtain a novel vented cover to pan joint.

A further object is to provide a device having the dual functions of a food warmer or a food cooker.

The above and other objects and advantages of the invention will appear more fully hereinafter from a consideration of the detailed description which follows, taken with the accompanying drawing wherein the invention is illustrated. It is to be understood, however, that the drawing is for the purpose of illustration only and is not intended to define the limits of the invention, reference being had for that purpose to the appended claims.

In the drawings wherein like reference characters refer to like parts throughout the several views:

FIGURE 1 is a section view of a cooking pan constructed according to the present invention;

FIGURE 2 is a cross section view of a dome-shaped cover adapted to fit over the rim of the cooking pan of FIGURE 1;

FIGURE 3 is a cross section view illustrating the cooking pan and cover therefor in assembled position, illustrating the interfit between the pan rim and the vented inverted U-shaped channel of the pan cover;

FIGURE 4 is a top plan view of the cooking pan and its novel enlarged bead-shaped rim formed with spaced vent notches or grooves; and FIGURE 5 is a bottom plan view of the cover of FIGURE 1, illustrating the concave or U-shaped channel thereof formed with spaced vent notches or grooves positioned at spaced staggered intervals with respect to the spaced vent notches or grooves of the operatively associated pan rim.

FIGURE 6 is a fragmentary longitudinal section view taken on the line 6—6 of FIGURE 2, showing the V-shaped configuration of the vent means in the pan rim bead.

Referring to the drawing and first with particular reference to the novel cooking pan A, the same is formed as by molding to provide a flat bottom 10, relatively thin low side walls 11 with an upper rim portion in the form of an enlarged rounded bead 12. A handle 13 extends angularly from the side walls 11 and may include a heat insulated portion 14, if desired.

The rounded rim portion 12 is formed with spaced notches or grooves 15. The grooves extend from the thin inner side walls 11 around the circumference of the relatively longer bead 12 to the thin outer side of the said relatively thin walls 11, see FIGURE 3.

As shown in FIGURE 2, there is provided a novel cover B formed with an inverted U-shaped open downwardly opening channel 16. The cover B is dome-shaped and is provided above the exterior of the channel 16 with vertical side walls 17, which continue upward into the rounded dome portion 18 of the cover.

The U-shaped channel 16 is formed at spaced intervals along the bore thereof with transverse notches or grooves 19. The vent means of the respective pan A and cover B are preferably V-shaped in cross section as shown in detail in FIGURE 6. Thus as the gases exhaust from the pan and cover enclosures, the venting action is slightly resistant, until the food being cooked or heated progresses toward boiling temperature. When the boiling temperature range is reached the venting action from the novel V-shaped notches 15 and 19 increases, that is, becomes more rapid as the gases being exhausted are expanded by increased pressure toward the flared portion of the V-notches.

The cover B at the exterior peak of the dome 18 is provided with a knob 20 to facilitate moving the cover to and from the pan rim 12.

The cover B is formed to collect gases emitted from the food as it is cooked and the straight vertical sides 17 at the foot or base of the dome portion 18 serve to assist in directing upwardly rising gases into the dome, which in turn as cooking pressure increases turns the same downwardly into the pan A, impinges it against the cooking food and thence the gases exhaust from the respective vent notches or grooves 15 and 19 to the atmosphere.

For example, as a boiling point or simmering temperature range is reached in the pan, the gases in foods, such as meat are emitted in a progressive manner and the moisture therein slowly evaporates, thereby liberating both oxygen and nitrogen. The nitrogen develops venting pressures more rapidly than the remaining gases and exhausts for the most part prior to the exhaust of the remaining gaseous products, whereby the resulting cooked product is expanded by the remaining gases, while it is simultaneously purged of any nitrogenous waste matter.

Thus with the present cooking units the meats, cutlets and the like cooked therein are freed of nitrogenous wastes bacteria, parasites and the like and will be more palatable. Also, with the removal of objectional matter during cooking the food thus cooked is more digestable and hamburgers, for example, when cooked in a pan preheated to a temperature of 170 degrees Fahrenheit will coagulate the meat and start the emission of gases. The cooking is continued for three to six minutes over a hot fire of approximately 200 degrees Fahrenheit, until the juices in the meat comes to the top of the hamburger, then remove the cover B, turn the hamburger over and cook for about two or three more minutes before removing the same.

Without further description it is believed that the novel combination of elements of the present invention has been sufficiently described and illustrated, to permit a clear understanding thereof as required under the patent statutes.

What is claimed is:

1. A cooking device with low thin side walls in the provision of a shallow pan, said side walls having an enlarged bead-shaped peripheral rim, and a plurality of spaced transverse grooves encircling the said bead-shaped rim, said grooves starting and terminating at said thin walls.

2. A cooking device as described in claim 1, wherein the said grooves are V-shaped in transverse cross-section.

3. A cover for a shallow cook pan comprising a dome portion, said dome portion having a base with a vertically straight base portion, and an inverted U-shaped channel formed below said base portion, said channel being formed with spaced transverse notches in the bore thereof.

4. A cooking device with low side walls in the provision of a shallow pan, said side walls having an enlarged bead-shaped rim, a plurality of spaced transverse grooves encircling the bead-shaped rim, and a cover for said shallow pan, said cover being dome-shaped and having an inverted U-shaped downwardly opening channel around the rim thereof, said channel resting over the said transversely grooved rim of the pan, said cover channel being scored at spaced intervals with transverse vent grooves, said grooves being staggered with respect to the spaced transverse grooves in the bead-shaped pan rim when the cover is resting on said rim.

References Cited in the file of this patent

UNITED STATES PATENTS

| | | |
|---|---|---|
| 577,794 | Stickney | Feb. 23, 1897 |
| 1,454,836 | Slocomb | May 8, 1923 |
| 1,624,461 | Barker | Apr. 12, 1927 |
| 1,646,858 | Grossenbacher | Oct. 25, 1927 |
| 1,862,778 | Vought | June 14, 1932 |
| 2,061,610 | Burnette | Nov. 24, 1936 |
| 2,415,613 | Sulak | Feb. 11, 1947 |
| 2,558,294 | Finizie | June 26, 1951 |
| 2,558,723 | Ayres | July 3, 1951 |
| 2,559,196 | Medved | July 3, 1951 |
| 2,827,379 | Phelan | Mar. 18, 1958 |
| 2,907,486 | Perez | Oct. 6, 1959 |